US008929256B2

(12) United States Patent
Cai et al.

(10) Patent No.: US 8,929,256 B2
(45) Date of Patent: Jan. 6, 2015

(54) THIRD PARTY CHARGING FOR SIP SESSIONS (75) Inventors: Yigang Cai, Naperville, IL (US); Tienyu Chiu, Naperville, IL (US); Eric H. Henrikson, Redmond, WA (US); E-Ling Lou, Naperville, IL (US); Bharat H. Patel, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 113 days.

(21) Appl. No.: 13/614,244

(22) Filed: Sep. 13, 2012

(65) Prior Publication Data
US 2013/0010651 A1 Jan. 10, 2013

Related U.S. Application Data (63) Continuation of application No. 11/553,520, filed on Oct. 27, 2006, now Pat. No. 8,289,885.

(51) Int. Cl.
*H04L 12/26* (2006.01)
*H04Q 11/00* (2006.01)
*H04L 29/06* (2006.01)
*H04L 12/14* (2006.01)

(52) U.S. Cl.
CPC .............. *H04L 12/14* (2013.01); *H04L 65/1016* (2013.01); *H04L 12/1471* (2013.01)
USPC ..... 370/259; 370/352; 379/88.13; 379/88.22; 379/114.28; 379/221.08; 455/405; 455/406; 455/461

(58) Field of Classification Search
CPC .. H04L 12/04; H04L 65/1016; H04L 12/1471
See application file for complete search history.

(56) References Cited

U.S. PATENT DOCUMENTS

2004/0139012 A1* 7/2004 Koskinen et al. ................ 705/40
2005/0271193 A1* 12/2005 Koskinen et al. ........ 379/114.01
2007/0119535 A1* 5/2007 Watanabe .................... 156/73.1

OTHER PUBLICATIONS

RFC 3603, Private Session Initiation Protocol (SIP) Proxy-to-Proxy Extensions for Supporting the PacketCable Distributed Call Signaling Architecture, Oct. 2003, IETF.*

* cited by examiner

*Primary Examiner* — Jae Y Lee
(74) *Attorney, Agent, or Firm* — Duft Bornsen & Fetig, LLP (57) ABSTRACT Communication networks and associated methods are disclosed that provide third party charging for SIP sessions. A communication network of the invention comprises a session control function (e.g., an IMS CSCF), a network node (e.g., an IMS application server), and a charging system. The session control function serves a SIP session initiated between a first and second party. The network node identifies a third party to charge for the session. The network node includes a third party identifier for the third party in a SIP message for the session, and transmits the SIP message to the session control function. The session control function generates a charging message, maps the third party identifier to the charging message, and transmits the charging message that includes the third party identifier to the charging system. The charging system then initiates charging of the session to the third party based on the third party identifier.

12 Claims, 7 Drawing Sheets

THIRD PARTY CHARGING FOR SIP SESSIONS

RELATED APPLICATIONS

This non-provisional patent application is a continuation of U.S. patent application Ser. No. 11/553,520 filed on Oct. 27, 2006 now U.S. Pat. No. 8,289,885, which is incorporated herein by reference.

BACKGROUND OF THE INVENTION

1. Field of the Invention

The invention is related to the field of communications and, in particular, to providing third party charging for SIP sessions or SIP transactions in communication networks, such as IMS networks.

2. Statement of the Problem

One type of communication network gaining popularity is an IP Multimedia Subsystem (IMS) network. As set forth in the $3^{rd}$ Generation Partnership Project (3GPP) or 3GPP2, IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

One problem with present IMS networks is that the offline charging mechanism defined by the 3GPP standards only includes information about the calling party and the called party to indicate who should be charged for a session. The 3GPP standards do not describe how to indicate that a call should be charged to a party other than the calling party or the called party. In some circumstances, it may be desirable to charge other parties to the call, such as calling card calls, credit card calls, a forwarded or transferred call, etc. The present standards do not provide such a mechanism.

SUMMARY OF THE SOLUTION

The invention solves the above and other problems by providing third party charging in communication networks, such as IMS networks, for a SIP session or SIP transaction between a first party and a second party. To implement third party charging, a third party is identified to charge for the session, and a third party identifier is included in SIP messages for the session. When charging messages are subsequently generated for the session, the charging messages likewise include a third party identifier. When a charging system receives the charging messages for the session with the third party identifier, the charging system is able to charge the third party for the session. This advantageously allows service providers, such as IMS service providers, to implement third party charging for SIP sessions which was not provided in the 3GPP standards.

In one embodiment of the invention, a communication network adapted to provide third party charging includes a session control function (e.g., an IMS CSCF), a network node (e.g., an IMS application server), and a charging system (offline or online). The session control function is adapted to serve a SIP session initiated between a first party and a second party. The network node is adapted to identify a third party to charge for the SIP session. The network node is further adapted to include a third party identifier for the third party in a SIP message for the session, and to transmit the SIP message to the session control function. The session control function is further adapted to receive the SIP message, and to generate a charging message for the session based on the SIP message. The session control function is further adapted to map the third party identifier in the SIP message to the charging message, and to transmit the charging message that includes the third party identifier over a charging interface. In one example, the charging interface may comprise a Diameter interface (Rf or Ro). The charging system is adapted to receive the charging message that includes the third party identifier, and to initiate charging of the session to the third party based on the third party identifier.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
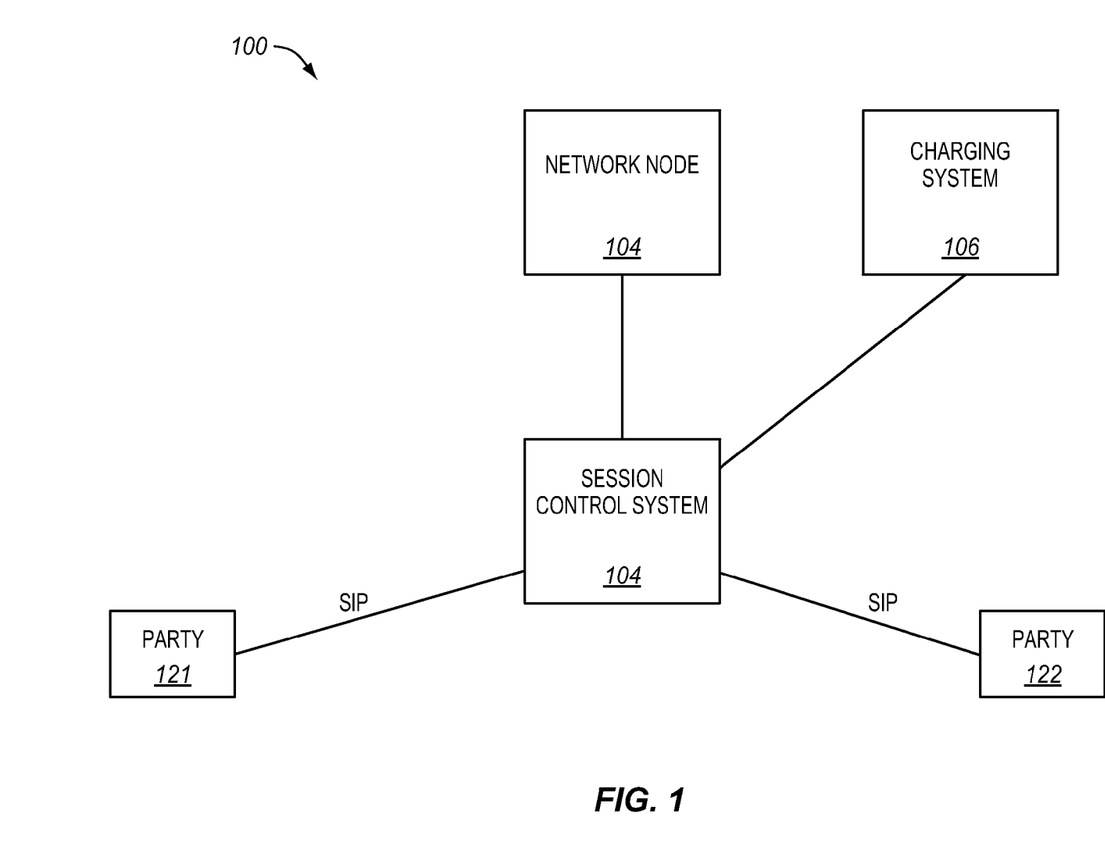
FIG. 1 illustrates a communication network in an exemplary embodiment of the invention.

FIG. 1 illustrates a communication network 100 in an exemplary embodiment of the invention. Communication network 100 may comprise an IMS network or another type of communication network adapted to support SIP sessions or SIP transactions. Although SIP is the protocol used in communication network 100 for session control, other protocols may be used for session control. Communication network 100 includes a session control function 102, a network node 104, and a charging system 106. Session control function 102 comprises any server(s), system, or application(s) that processes SIP messages for session control, and transmits charging messages for session charging. For example, in an IMS network implementing offline charging, a session control function 102 may comprise a Call Session Control Function (CSCF), such as described in the 3GPP standards. In another example, in an IMS network implementing online charging, a session control function 102 may comprise a CSCF and an IMS gateway function, such as described in the 3GPP standards. A network node 104 comprises any server(s), system, or application(s) that serve the session in some manner. According to features and aspects herein, network node 104 serves the session by determining a third party to charge for a session, among other possible functions. One example of a network node 104 may be an Application Server (AS), such as described in the 3GPP standards. Charging system 106 comprises any server(s), system, or application(s) that provides for charging for a session. For example, in an IMS network implementing offline charging, a charging system 106 may comprise a Charging Collection Function (CCF) and a billing system, such as described in the 3GPP standards. In another example, in an IMS network implementing online charging, a charging system 106 may comprise an Online Charging System (OCS), such as described in the 3GPP standards.

Assume for this embodiment that a SIP session is initiated or established in communication network 100 between a first party 121 and a second party 122. The session may be an IMS session, a wireless call, a text or multimedia message, etc. Session control function 102 is adapted to serve the SIP session initiated between first party 121 and second party 122. In serving the SIP session, session control function 102 facilitates the exchange of SIP messages between first party 121 and second party 122 (and other network nodes) to setup, maintain, and tear down the SIP session. According to features and aspects herein, communication network 100 is adapted to provide third party charging for the session.

Figure 2:
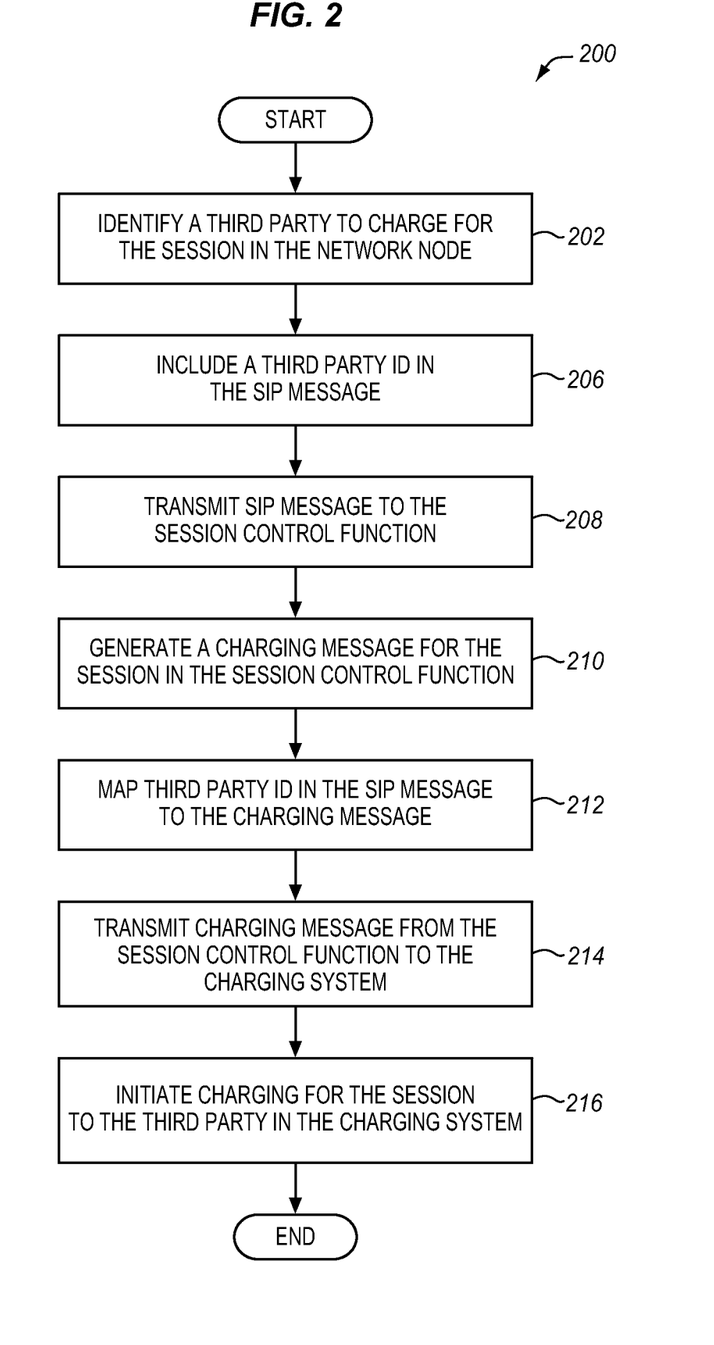
FIG. 2 is a flow chart illustrating a method of operating the communication network of FIG. 1 to provide third party charging in an exemplary embodiment of the invention.

FIG. 2 is a flow chart illustrating a method 200 of operating communication network 100 to provide third party charging in an exemplary embodiment of the invention. The steps of method 200 will be described with reference to communication network 100 in FIG. 1. The steps of the flow chart in FIG. 2 are not all inclusive and may include other steps not shown.

In step 202, network node 104 identifies a third party to charge for the SIP session. A third party comprises any party other than the first party 121 (calling party) and the second party 122 (called party). Network node 104 may identify the third party in a variety of ways. In one example, network node 104 may identify the third party to charge based on a dialed number for the session, such as a directory number for a calling card or a directory number for a credit card company. In another example, network node 104 may prompt first party 121 or second party 122 for a third party to charge for the session, such as through interactive voice, text message, multimedia message, etc.

In step 206, network node 104 includes or inserts a third party identifier (ID) for the third party in a SIP message for the session. The SIP message may comprise a SIP INVITE message or another message that network node 104 generates or proxies for the session. The third party ID comprises any name, number, network address, etc, used to identify the third party in communication network 100, such as a Public User ID (PUID) in IMS networks. Network node 104 may include the third party ID in a particular header of the SIP message. For instance, network node 104 may include the third party ID in a P-DCS-Billing-Info header of a SIP message. In step 208, network node 104 transmits the SIP message to session control function 102.

In step 210, session control function 102 receives the SIP message, and generates a charging message for the session based on the SIP message and possibly other related SIP responses. Session control function 102 may process charging triggers responsive to receiving the SIP message to determine if a charging message should be triggered responsive to the SIP message. A charging message comprises any message or signaling used to report session information for the purpose of charging for the session. The charging message may comprise a Diameter (Rf or Ro) charging message, such as a Diameter Accounting Request (ACR) message, or a charging message of another protocol.

In step 212, session control function 102 maps the third party ID in the SIP message to the charging message. Session control function 102 may map the third party ID to a particular parameter of the charging message. In step 214, session control function transmits the charging message that includes the third party ID over a charging interface. The charging interface may comprise a Diameter (Rf or Ro) charging interface or another type of interface.

In step 216, charging system 106 receives the charging message that includes the third party ID over the charging interface, and initiates charging of the session to the third party based on the third party ID. The charging for the session may be online charging or offline charging in this embodiment. For instance, charging system 106 may initiate offline charging by generating a Charging Data Record (CDR) for the session charging the third party. Charging system 106 may initiate online charging by performing account management for the session using the account of the third party.

Figure 9:
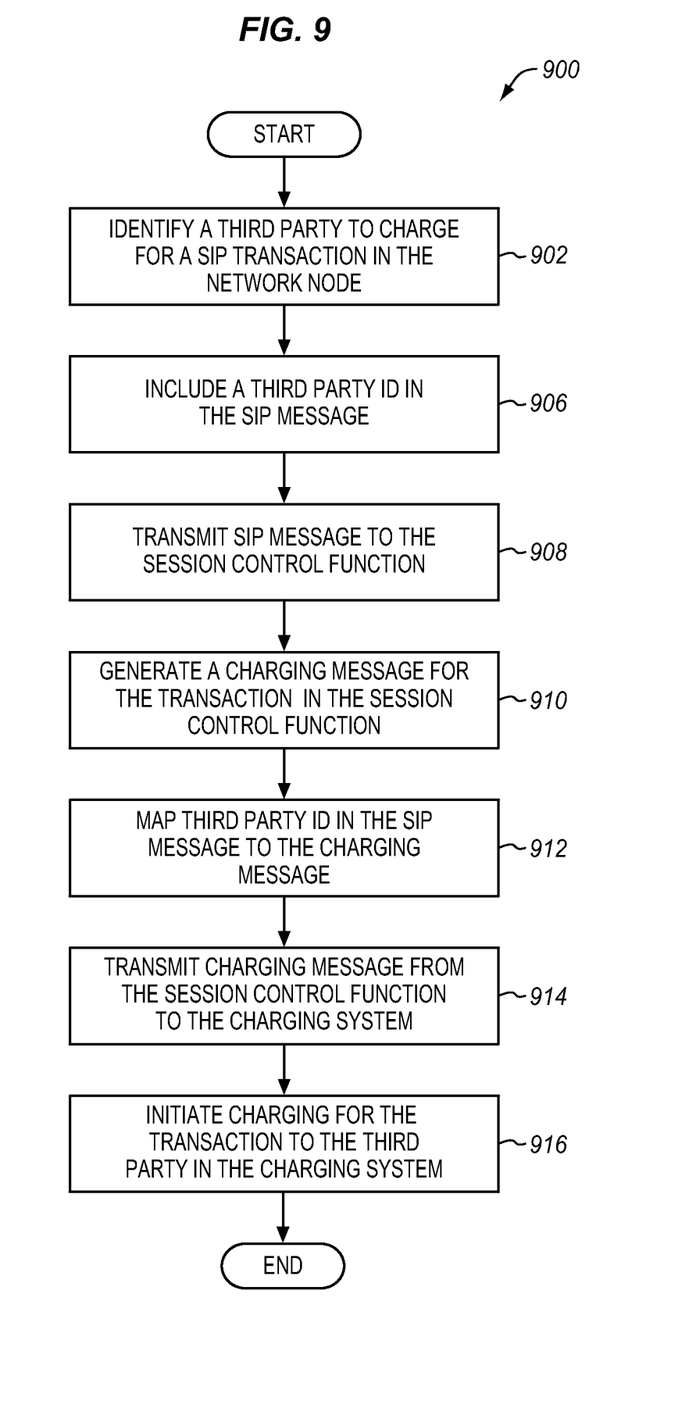
FIG. 9 is a flow chart illustrating another method of operating the communication network of FIG. 1 to provide third party charging in an exemplary embodiment of the invention.

FIG. 2 discusses third party charging for SIP sessions. However, an actual SIP session may not be established through SIP dialog between party 121 and party 122. For instance, party 121 may transmit a standalone SIP request that includes a text attachment, a multimedia attachment, or another type of attachment. The SIP request (or the data included in the SIP request) is destined for party 122, but an actual session may not be established. The invention applies equally to SIP sessions or standalone SIP requests. FIG. 9 illustrates an embodiment where a standalone SIP request is received from party 121.

FIG. 9 is a flow chart illustrating a method 900 of operating communication network 100 to provide third party charging in an exemplary embodiment of the invention. The steps of method 900 will be described with reference to communication network 100 in FIG. 1. The steps of the flow chart in FIG. 9 are not all inclusive and may include other steps not shown.

In step 902, network node 104 identifies a third party to charge for a SIP transaction, such as responsive to receiving a standalone SIP request. In step 906, network node 104 includes or inserts a third party ID for the third party in a SIP message for the transaction. In step 908, network node 104 transmits the SIP message to session control function 102.

In step 910, session control function 102 receives the SIP message, and generates a charging message for the transaction based on the SIP message. In step 912, session control function 102 maps the third party ID in the SIP message to the charging message. In step 914, session control function 102 transmits the charging message that includes the third party ID over a charging interface. In step 216, charging system 106 receives the charging message, and initiates charging of the transaction to the third party based on the third party ID.

Figure 3:
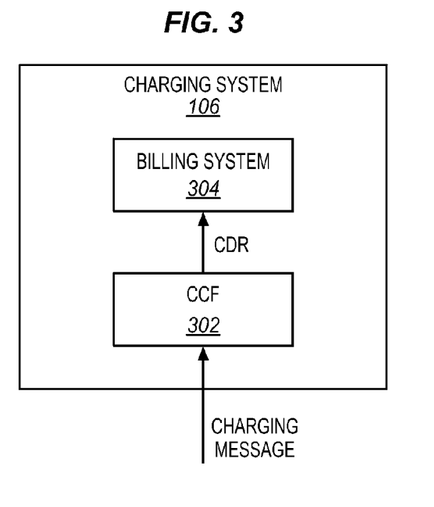
FIGS. 3-5 illustrate exemplary embodiments of charging systems.
Figure 4:
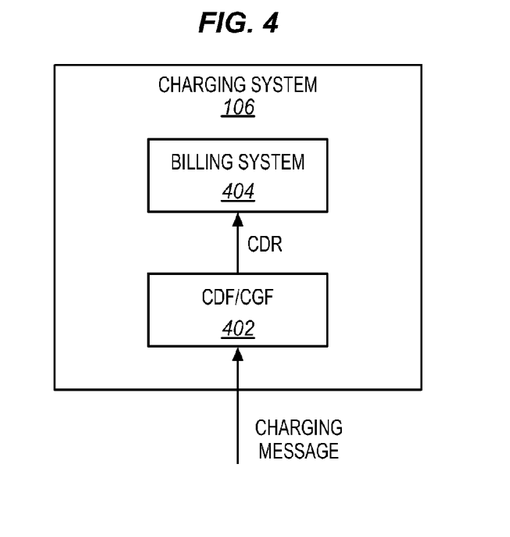
Figure 5:
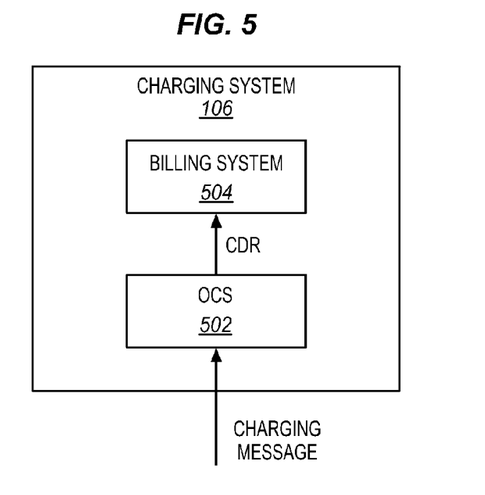

Charging system 106 may be implemented in a variety of ways to provide offline and/or online charging in FIG. 2 and FIG. 9. FIGS. 3-5 illustrate exemplary charging systems 106, but charging system 106 is not limited to any of these embodiments.

FIG. 3 illustrates an embodiment of charging system 106 that is adapted to provide offline charging. Charging system 106 includes a Charging Collection Function (CCF) 302 and a billing system 304 as suggested by the 3GPP in Release 5 that is available at www.3gpp.org. CCF 302 is adapted to receive the charging message from session control function 102 (see FIG. 1), and process the charging message to generate a Charging Data Record (CDR) for the session. The charging message includes the third party ID, and CCF 302 maps the third party ID in the charging message to the CDR. CCF 302 may map the third party ID to a new field of the CDR or to an existing field of the CDR used to define third party charging. Billing system 304 receives the CDR, and processes the CDR to identify the party to charge for the session. Because the CDR includes the third party ID, billing system 304 charges the third party for the session instead of charging party 121 or party 122 (see FIG. 1).

FIG. 4 illustrates another embodiment of charging system 106 that is adapted to provide offline charging. Charging system 106 includes a Charging Data Function and Charging Gateway Function (CDF/CGF) 402 and a billing system 404 as suggested by the 3GPP in Release 6. CDF/CGF 402 is functionally equivalent to CCF 302 in FIG. 3 and generates a CDR for the session as described above for FIG. 3.

FIG. 5 illustrates an embodiment of charging system 106 that is adapted to provide online charging. Charging system 106 includes an Online Charging System (OCS) 502 and a billing system 504 as described in the 3GPP TS 32.240 specification and the 3GPP TS 32.260 specification. OCS 502 is adapted to receive the charging message, such as a Diameter Credit Control Request (CCR) message from session control function 102 (see FIG. 1), which includes the third party ID. OCS 502 processes the charging message, and manages the charging party account (which is the $3^{rd}$ party charging account) for the third party to provide online charging based on the third party ID. OCS 502 will manage credit usage and deduct the amount or unit of the call from the charging party account of the third party. After the session is completed, OCS 502 generates a CDR for the session. OCS 502 maps the third party ID of the charging party account that was charged for the session to the CDR. OCS 502 may map the third party ID to a new field of the CDR or to an existing field of the CDR used to define third party charging. Billing system 504 receives the CDR, and processes the CDR (see FIG. 1).

Figure 6:
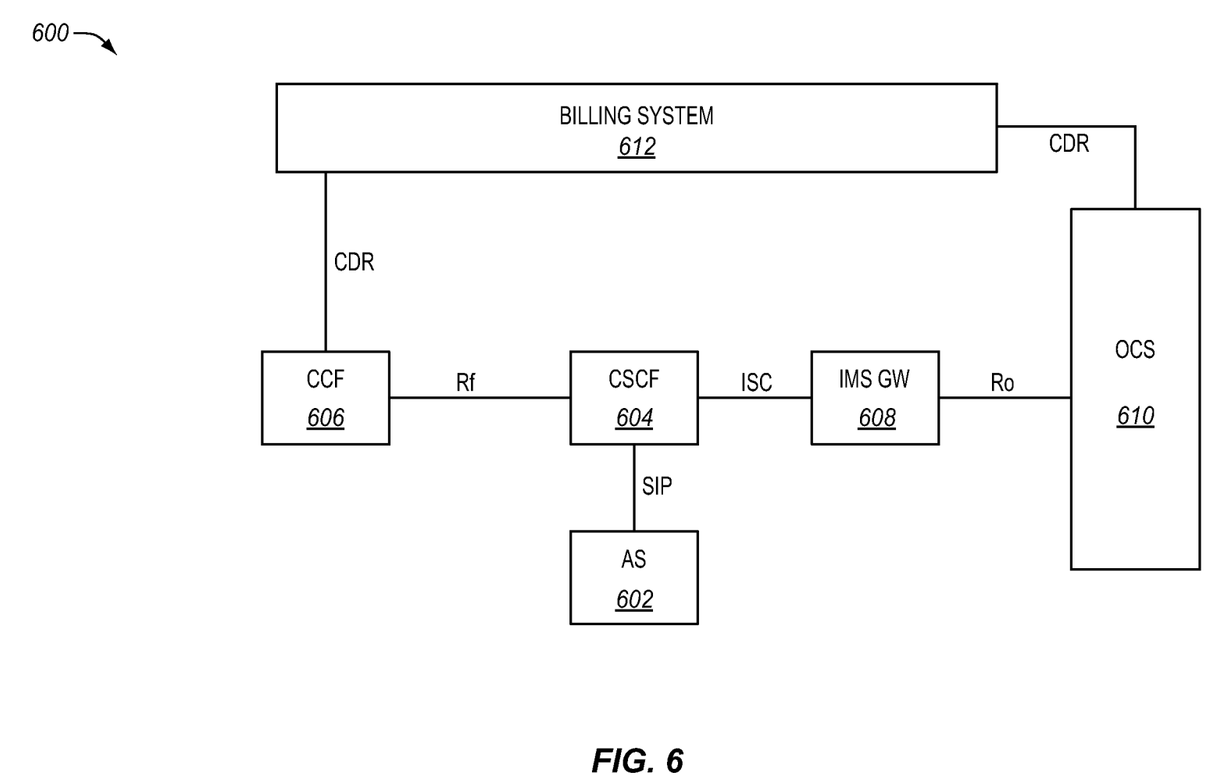
FIG. 6 illustrates an IMS network in an exemplary embodiment of the invention.
Figure 7:
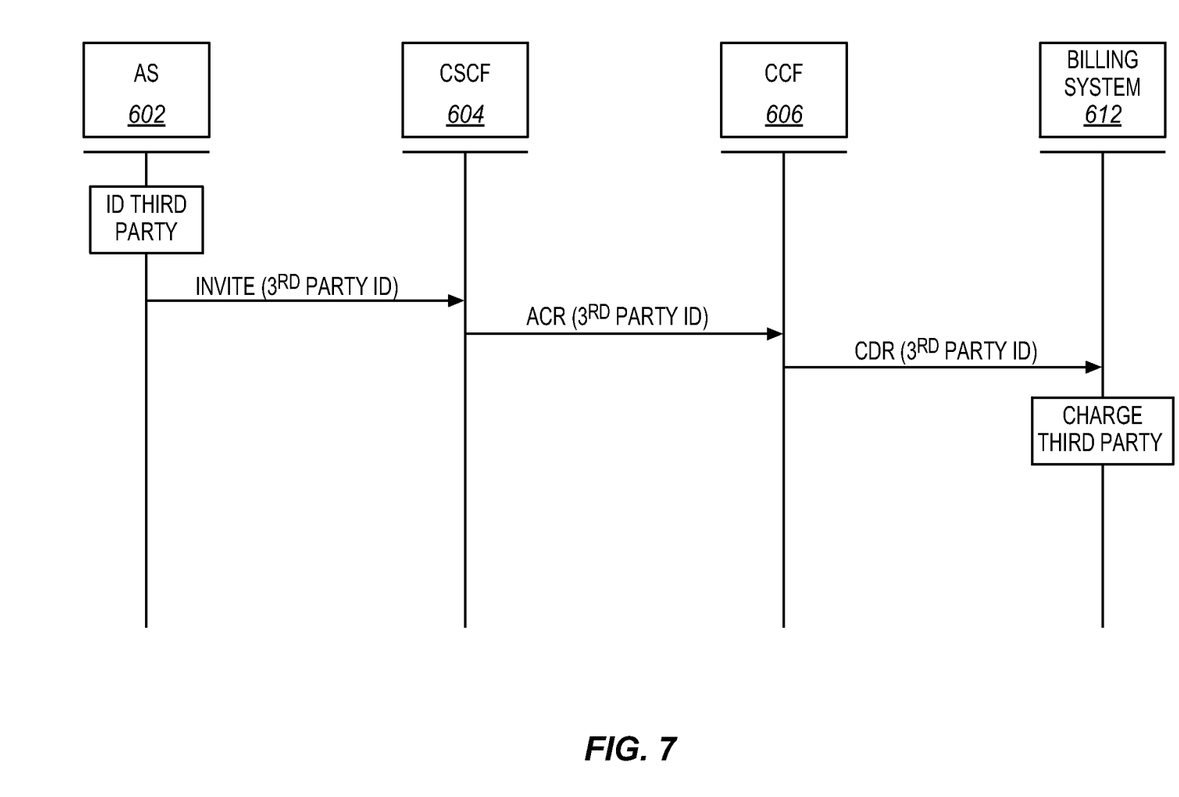
FIG. 7 is a message diagram illustrating messaging in an IMS network to provide third party offline charging in an exemplary embodiment of the invention.
Figure 8:
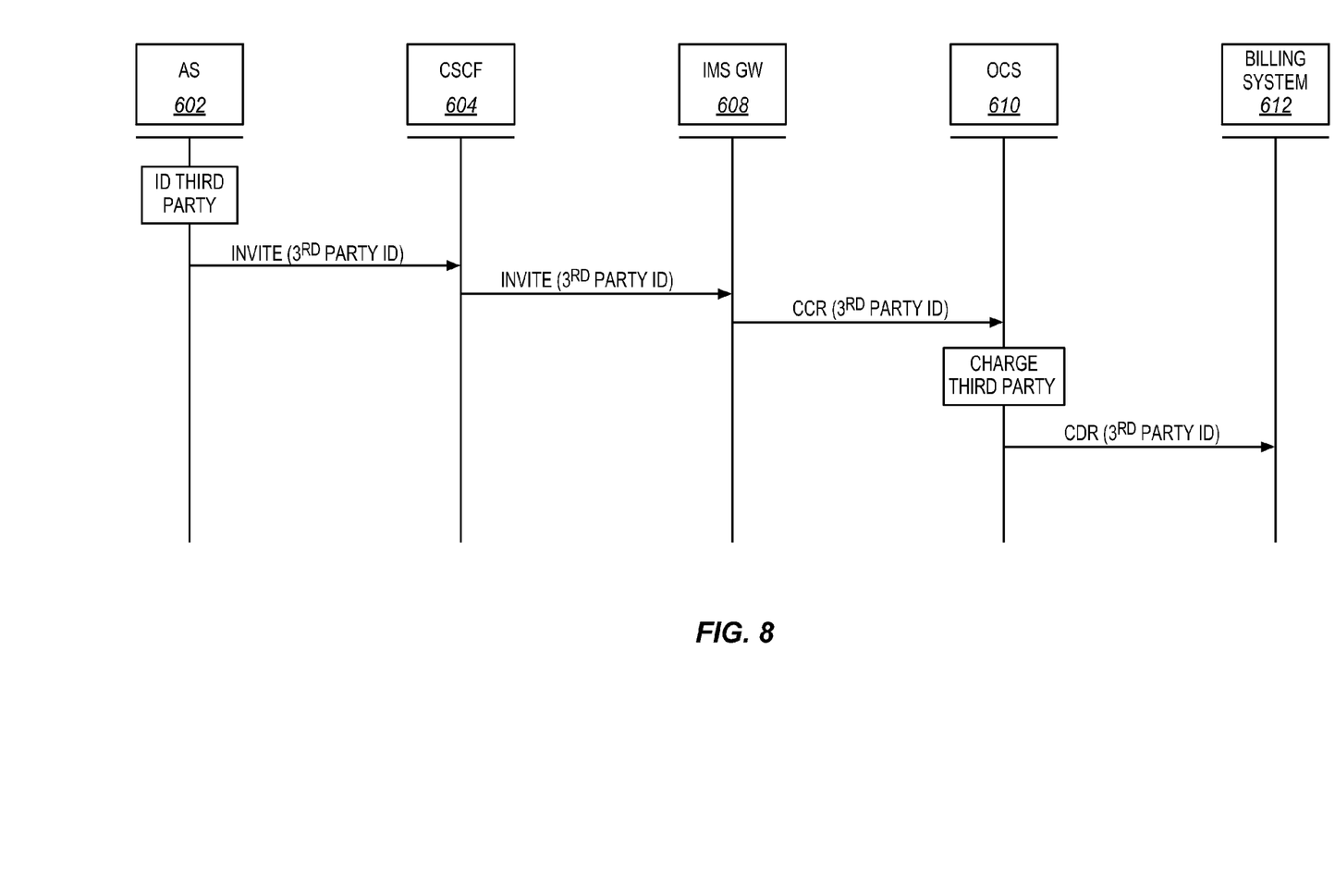
FIG. 8 is a message diagram illustrating messaging in an IMS network to provide third party online charging in an exemplary embodiment of the invention.

The above embodiments advantageously describe third party charging for SIP sessions. One particular type of network using SIP sessions is IMS networks. As stated in the Background, IMS networks do not presently allow for third party charging. FIGS. 6-8 illustrate third party charging in IMS networks according to features and aspects provided herein.

FIG. 6 illustrates an IMS network 600 in an exemplary embodiment of the invention. IMS network 600 includes an Application Server (AS) 602, a Call Session Control Function (CSCF) 604, a Charging Collection Function (CCF) 606, an IMS gateway function (IMS GW) 608, an Online Charging System (OCS) 610, and a billing system 612. Application server 602 is adapted to communicate with CSCF 604 through SIP. CSCF 604 is adapted to communicate with CCF 606 through Diameter Rf protocol, and is adapted to communicate with IMS GW 608 through SIP (ISC interface). IMS GW 608 is adapted to communicate with OCS 610 through Diameter Ro protocol. CCF 606 and OCS 610 are adapted to communicate with billing system 612 through any file transport protocol, such as FTP.

Assume for this embodiment that a SIP session is initiated or established in IMS network 600 between a first party and a second party (not shown). CSCF 604 is adapted to serve the SIP session initiated between the first party and the second party, and coordinate SIP messaging with application server 602. In serving the SIP session, CSCF 604 facilitates the exchange of SIP messages between the parties to setup, maintain, and tear down the SIP session. Although sessions are described in this embodiment, this discussion applies equally to standalone SIP requests. According to features and aspects herein, IMS network 600 is adapted to provide third party charging for the session.

FIG. 7 is a message diagram illustrating messaging in IMS network 600 to provide third party offline charging in an exemplary embodiment of the invention. To provide third party charging, application server 602 first identifies a third party to charge for the SIP session. One of the parties to the session may be the trigger for application server 602 identifying the third party to charge (not shown in FIG. 7). Application server 602 may identify the third party in a variety of ways. In one example, application server 602 may identify the third party to charge based on a dialed number for the session. For instance, the first party may use a calling card or a credit card to initiate the session. The first party would enter a directory number, such as a toll free number, for the calling card company or the credit card company. Based on the dialed number, IMS network 600 routes the call to application server 602. Based on the number entered by the first party, application server 602 is able to determine that the calling card company or the credit card company should be charged for the session. In another example, application server 602 may prompt the first party or the second party for a third party to charge for the session, such as through interactive voice, a text message, a multimedia message, etc. In another example, the session may be transferred or forwarded by a party to the session, and application server 602 may identify the transferring or forwarding party as the third party to charge for the remainder of the session (even though this party is no longer a party to the session).

After identifying the third party, assume that application server 602 generates a SIP INVITE message for the session or proxies a received SIP INVITE message. Application server 602 includes a third party ID for the third party in a P-DCS-Billing-Info header in the INVITE message. The third party ID may be a Public User ID (PUID) for the third party. The purpose of third party ID in this header is to indicate that this session should be charged to the identity included in this header rather than the PUID included in the P-Asserted-Identity header of the INVITE message. Application server 602 then transmits the INVITE message to CSCF 604. CSCF 604 receives the INVITE message, and generates a Diameter Accounting Request (ACR) message for the session (start/interim/stop). CSCF 604 maps the third party ID from the P-DCS-Billing-Info header in the INVITE message to an Attribute Value Pair (AVP) in the ACR message. The AVP in the ACR message used for the third party ID may be a new AVP labeled "$3^{rd}$-Party-Charging-Address" or something similar. In another embodiment, a present AVP may be re-used in the ACR message. CSCF 604 then transmits the ACR message to CCF 606. CSCF 604 may also remove the third party ID from the INVITE message before forwarding the INVITE message to other network nodes. CSCF 604 may operate similarly for multiple SIP messages received for the session.

CCF 606 receives the ACR message (and possibly other ACR messages) that includes the third party ID, and processes the ACR to generate a Charging Data Record (CDR) for the session. CCF 606 maps the third party ID in the ACR message to a field in the CDR. The field in the CDR used for the third party ID may be a new RecordExtension sub field labeled "3$^{rd}$PartyChargingAddress" or something similar. In another embodiment, a present field may be re-used in the CDR. CCF 606 then transmits the CDR to billing system 612. Billing system 612 receives the CDR, and processes the CDR to identify the party to charge for the session. Because the CDR includes the third party ID, billing system 612 charges the third party for the session instead of charging the first party or the second party.

FIG. 8 is a message diagram illustrating messaging in IMS network 600 to provide third party online charging in an exemplary embodiment of the invention. To provide third party charging, application server 602 first identifies a third party to charge for the SIP session. After identifying the third party, application server 602 generates or proxies a SIP INVITE message for the session, and includes a third party ID for the third party in a P-DCS-Billing-Info header in the INVITE message. Application server 602 then transmits the INVITE message to CSCF 604. CSCF 604 receives the INVITE message, and forwards the INVITE message to IMS GW 608. IMS GW 608 generates a Diameter Credit Control Request (CCR) message for the session. IMS GW 608 maps the third party ID from the P-DCS-Billing-Info header in the INVITE message to an AVP in the CCR message. The AVP in the CCR message used for the third party ID may be a new AVP labeled "3$^{rd}$-Party-Charging-Address" or something similar. In another embodiment, a present AVP may be re-used in the CCR message. IMS GW 608 then transmits the CCR message to OCS 610.

OCS 610 receives the CCR message that includes the third party ID. OCS 610 processes the CCR, and manages the charging party account (which is the 3$^{rd}$ party charging account) for the third party to provide online charging based on the third party ID. OCS 610 will manage credit usage and deduct the amount or unit of the session from the charging party account of the third party. After the call completed, OCS 610 generates a CDR for the session. OCS 610 maps the third party ID in the CCR message to a field in the CDR. The field in the CDR used for the third party ID may be a new field labeled "3$^{rd}$PartyChargingAddress" or something similar. In another embodiment, a present field may be re-used in the CDR. OCS 610 then transmits the CDR to billing system 612.

Although specific embodiments were described herein, the scope of the invention is not limited to those specific embodiments. The scope of the invention is defined by the following claims and any equivalents thereof.

We claim:

1. A system comprising:
an application server configured to serve a session initiated between a first party and a second party;
the application server is configured to receive a Session Initiation Protocol (SIP) message for the session, to trigger charging for the session based on the SIP message by generating a charging message for the session, to process the SIP message to identify a third party identifier for a third party to charge for the session, to insert the third party identifier from the SIP message into the charging message, and to transmit the charging message to a charging system to initiate charging for the session to the third party.

2. The system of claim 1 wherein:
the application server is configured to process a P-DCS-Billing-Info header of the SIP message to identify the third party identifier, and to insert the third party identifier from the P-DCS-Billing-Info header into the charging message.

3. The system of claim 2 wherein:
the third party identifier in the P-DCS-Billing-Info header indicates that the session be charged to an identity included in the P-DCS-Billing-Info header rather than an identity included in a P-Asserted-Identity header of the SIP message.

4. The system of claim 2 wherein:
the third party identifier comprises a Public User ID (PUID) for the third party.

5. The system of claim 1 wherein:
the application server connects with the charging system over a Diameter interface; and
the application server is configured to generate a Diameter charging message, and to map the third party identifier to a new Attribute Value Pair (AVP) in the Diameter charging message.

6. The system of claim 1 wherein:
the application server is for an IP Multimedia Subsystem (IMS) network.

7. A method operable in an application server that serves a session initiated between a first party and a second party, the method comprising:
receiving a Session Initiation Protocol (SIP) message for the session in the application server;
processing the SIP message to identify a third party identifier for a third party to charge for the session;
triggering charging for the session based on the SIP message by generating a charging message for the session;
inserting the third party identifier from the SIP message into the charging message; and
transmitting the charging message from the application server to a charging system to initiate charging for the session to the third party.

8. The method of claim 7:
wherein processing the SIP message comprises processing a P-DCS-Billing-Info header of the SIP message to identify the third party identifier; and
wherein inserting the third party identifier from the SIP message comprises inserting the third party identifier from the P-DCS-Billing-Info header into the charging message.

9. The method of claim 8 wherein:
the third party identifier in the P-DCS-Billing-Info header indicates that the session be charged to an identity included in the P-DCS-Billing-Info header rather than an identity included in a P-Asserted-Identity header of the SIP message.

10. The method of claim 8 wherein:
the third party identifier comprises a Public User ID (PUID) for the third party.

11. The method of claim 7 wherein:
the application server connects with the charging system over a Diameter interface; and
the method further includes generating a Diameter charging message, and mapping the third party identifier to a new Attribute Value Pair (AVP) in the Diameter charging message.

12. The method of claim 7 wherein:
the application server is for an IP Multimedia Subsystem (IMS) network.

* * * * *